(12) United States Patent
Wuang et al.

(10) Patent No.: US 12,266,009 B2
(45) Date of Patent: Apr. 1, 2025

(54) VIRTUAL THREE DIMENSIONAL SHOWROOM SYSTEM AND METHOD

(71) Applicant: Top-Line Furniture Warehouse Corp., Itasca, IL (US)

(72) Inventors: Felix Wuang, Schaumburg, IL (US); Po Chou Chi, Taipei (TW)

(73) Assignee: Top-Line Furniture Warehouse Corp., Itasca, IL (US)

( * ) Notice: Subject to any disclaimer, the term of this patent is extended or adjusted under 35 U.S.C. 154(b) by 312 days.

(21) Appl. No.: 17/460,082

(22) Filed: Aug. 27, 2021

(65) Prior Publication Data

US 2023/0063885 A1 Mar. 2, 2023

(51) Int. Cl.
*G06Q 30/0601* (2023.01)
*G06F 3/01* (2006.01)
*G06T 15/20* (2011.01)
*G06T 19/00* (2011.01)

(52) U.S. Cl.
CPC ......... *G06Q 30/0643* (2013.01); *G06F 3/011* (2013.01); *G06Q 30/0621* (2013.01); *G06Q 30/0633* (2013.01); *G06T 15/20* (2013.01); *G06T 19/003* (2013.01)

(58) Field of Classification Search
CPC ........... G06Q 30/0643; G06Q 30/0621; G06Q 30/0633
See application file for complete search history.

(56) References Cited

U.S. PATENT DOCUMENTS

| | | | | |
|---|---|---|---|---|
| 2,941,314 | A * | 6/1960 | Schwieger | G09B 25/08 434/73 |
| 7,062,722 | B1 * | 6/2006 | Carlin | G06T 15/10 715/848 |
| 7,277,572 | B2 | 10/2007 | MacInnes et al. | |
| 7,353,192 | B1 * | 4/2008 | Ellis | G06Q 30/02 715/765 |
| 10,600,255 | B2 | 3/2020 | Besecker et al. | |
| 10,672,191 | B1 | 6/2020 | Besecker et al. | |

(Continued)

OTHER PUBLICATIONS

How to Decorate Your New Home Before You Move. Biersdorfer, J D. International New York Times. Mar. 30, 2021: (Year: 2021).*

(Continued)

*Primary Examiner* — Michael Misiaszek
(74) *Attorney, Agent, or Firm* — Procopio, Cory, Hargreaves & Savitch LLP

(57) ABSTRACT

Aspects presented herein provide a virtual showroom system and method that facilitates users to arrange showcase items of interest in different virtual environments and settings. In one aspect, an online virtual showroom system provides a first interface including a first virtual 3D environment, the first virtual 3D environment including multiple objects that are selectable through the first interface for placement into a list. The online virtual showroom system provides a second interface including a second virtual 3D environment that is separate from the first virtual 3D environment, the second interface configured to receive a selection of ones of the multiple objects placed into the list for rendering in the second virtual 3D environment and receive an input to manipulate one or more objects from the selected and rendered ones of the multiple objects placed into the list in the second virtual 3D environment.

23 Claims, 12 Drawing Sheets

(56) References Cited

U.S. PATENT DOCUMENTS

| | | | |
|---|---|---|---|
| 11,017,611 B1* | 5/2021 | Mount | G06V 20/20 |
| 11,049,317 B2 | 6/2021 | Besecker et al. | |
| 11,204,678 B1* | 12/2021 | Baker | G06F 3/04842 |
| 2002/0010655 A1* | 1/2002 | Kjallstrom | G06Q 30/0625 |
| | | | 705/26.62 |
| 2018/0232800 A1 | 8/2018 | Mattingly et al. | |
| 2019/0019346 A1* | 1/2019 | Cuthbertson | G06Q 30/00 |
| 2019/0163434 A1 | 5/2019 | Besecker et al. | |
| 2020/0379625 A1* | 12/2020 | Wang | G06F 3/0482 |
| 2021/0065287 A1* | 3/2021 | Sights | G06F 3/04815 |
| 2021/0304500 A1* | 9/2021 | Tan | G06T 19/003 |
| 2022/0036440 A1* | 2/2022 | Jaeger | G06F 16/56 |
| 2022/0215462 A1* | 7/2022 | Lobbato | G06Q 20/3276 |

OTHER PUBLICATIONS

Amazon debuts Showroom, a visual shopping experience for home furnishings. Sarah Perez. Tech Crunch. Jan. 4, 2019. <https://techcrunch.com/2019/01/04/amazon-debuts-showroom-a-visual-shopping-experience-for-home-furnishings/> (Year: 2019).*

Hon Room Designer—Visualize Office Solutions in Your Home, https://hon-sceneconfigurator-cert.3dcloud.io/, visited Sep. 24, 2021.

Bob's 3D Room Planner, https://roomdesigner.mybobs.com/, visited Sep. 24, 2021.

Marxent 3D Solutions for Inspire Q, 3D Cloud powered by Marxent, 2021.

American Furniture Warehouse Launches New 3D Room Planner, Powered by Marxent's 3D Cloud, PR Newswire Apr. 22, 2021.

* cited by examiner

VIRTUAL THREE DIMENSIONAL SHOWROOM SYSTEM AND METHOD

TECHNICAL FIELD

The present disclosure relates generally to a user interface for a virtual showroom system for showcasing items via an online and virtual environment, such as via the Internet. The items may include, but are not limited to, furniture items.

INTRODUCTION

A virtual environment may enable a user to interact with various objects and/or other user(s) in a computer rendered environment and in a variety of ways. For example, an architect may create and use a virtual environment to showcase the architect's designs, such that others may be able to visualize the architect's work in multiple ways. A virtual environment may also be accessed from a variety of places (e.g., from places with Internet) using a variety of ways, thus providing a convenient alternative for people who are unable to visit certain places. Aspects presented herein provide a virtual showroom system and method that facilitates users to arrange showcase items of interest in different virtual environments and settings.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method for implementing a virtual showroom system is provided. The method includes providing a first interface including a first virtual three-dimensional (3D) environment, the first virtual 3D environment including multiple objects that are selectable through the first interface for placement into a list; providing a second interface including a second virtual 3D environment that is separate from the first virtual 3D environment, the second interface configured to: receive a selection of ones of the multiple objects placed into the list for rendering in the second virtual 3D environment; and receive an input to manipulate one or more objects from the selected and rendered ones of the multiple objects placed into the list in the second virtual 3D environment.

In another aspect of the disclosure, an apparatus for implementing a virtual showroom is provided. The apparatus includes memory and at least one processor coupled to the memory, the memory and the at least one processor being configured to provide a first interface including a first virtual 3D environment, the first virtual 3D environment including multiple objects that are selectable through the first interface for placement into a list; provide a second interface including a second virtual 3D environment that is separate from the first virtual 3D environment, the second interface configured to: receive a selection of ones of the multiple objects placed into the list for rendering in the second virtual 3D environment; and receive an input to manipulate one or more objects from the selected and rendered ones of the multiple objects placed into the list in the second virtual 3D environment.

In another aspect of the disclosure, an apparatus for implementing a virtual showroom is provided. The apparatus includes means for providing a first interface including a first virtual 3D environment, the first virtual 3D environment including multiple objects that are selectable through the first interface for placement into a list; means for providing a second interface including a second virtual 3D environment that is separate from the first virtual 3D environment, the second interface configured to: receive a selection of ones of the multiple objects placed into the list for rendering in the second virtual 3D environment; and receive an input to manipulate one or more objects from the selected and rendered ones of the multiple objects placed into the list in the second virtual 3D environment.

In another aspect of the disclosure, a non-transitory computer-readable medium for implementing a virtual showroom is provided. The computer-readable medium includes code to provide a first interface including a first virtual 3D environment, the first virtual 3D environment including multiple objects that are selectable through the first interface for placement into a list; provide a second interface including a second virtual 3D environment that is separate from the first virtual 3D environment, the second interface configured to: receive a selection of ones of the multiple objects placed into the list for rendering in the second virtual 3D environment; and receive an input to manipulate one or more objects from the selected and rendered ones of the multiple objects placed into the list in the second virtual 3D environment.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
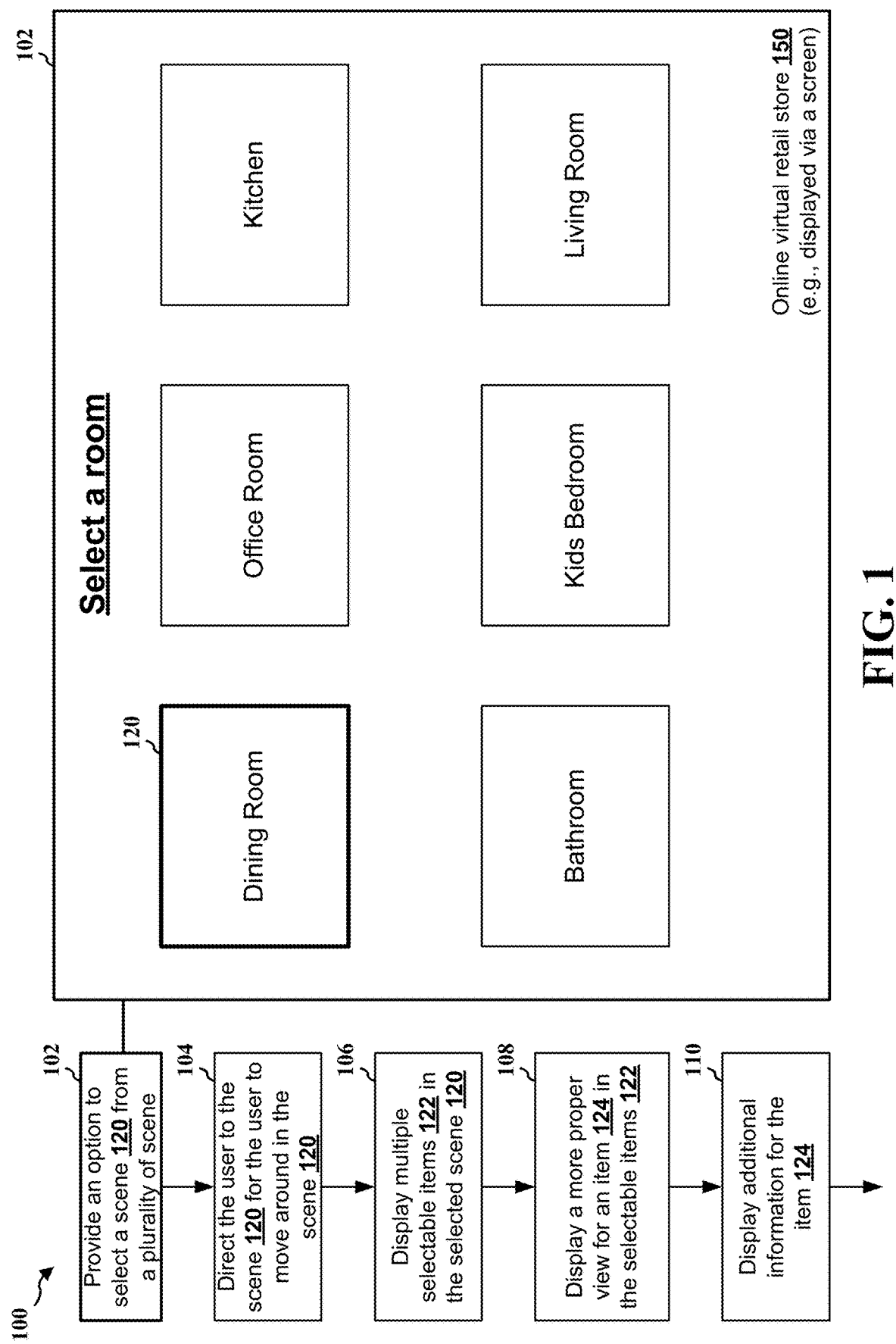
FIG. 1 a diagram illustrating an example online virtual retail store purchase flow in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of virtual retail systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

The present disclosure is directed to virtual showroom systems that can be incorporated into a virtual retail environment. The terms showroom and retail environment may be used interchangeably throughout the present disclosure.

Online shopping has become a dominant form of shopping over the last few years. Online shopping is a form of electronic commerce which may enable people (e.g., consumers) to purchase goods or services from other people (e.g., sellers) over the Internet using a computer (e.g., via a web browser) or a mobile device (e.g., via a mobile application). For example, a person may find a product of interest by visiting a website of the retailer directly or by searching among alternative vendors using a shopping search engine.

A website or a mobile application providing online shopping typically includes a search feature in which a shopper may use for finding specific items, brands, and/or models. After the shopper finds the item(s) of interest, the shopper may pay for the item(s) online to complete a transaction, such as by using a credit card, or a third-party payment service. Then, the shopper may receive the purchased item(s) via delivery or by pick up the purchased item(s) at a designated location.

While online shopping may provide consumers with a convenient way to purchase product of interest, such as enable the consumers to purchase product from the comfort of their own homes or work place, online shopping also has certain drawbacks. For example, among other things, consumers may find online shopping lacks interactivity compared to in-store shopping, where consumers may not be able to look at the product in three-dimensional (3D) views or browsing the product in a setting similar to in-store shopping (e.g., for online shopping, the product is often listed in a search result page with photos). Further, objects that would normally be examined physically for functionality or other aspects (e.g., furniture, vehicles, etc.) are more difficult to represent in an online shopping environment. In particular, due to quarantine or lockdown measures put in place from pandemics, users who would typically visit a showroom in person to determine the physical functionality, dimensions, and other aspects of such objects may be unable to do so, with no representative virtual environment to facilitate the same experience.

On the other hand, while in-store shopping may enable consumers to get a physical feel of a product, the product may be limited in sizes, colors, and/or models. For example, due to limited physical spaces at a furniture store, the furniture store may only be able to display a few models of a furniture at a time (e.g., a wardrobe with a specified color, size, and/or model, etc.). In other words, a real-life showroom may only display a limited subset of what the store has available for the consumer to purchase. Thus, consumers may not always be able to visualize other models of the furniture that are not displayed. In addition, if a consumer has multiple items to purchase, the consumer may not be able to arrange the items to see if different items will match with each other. For example, a consumer who wants to purchase a bed frame and a wardrobe at a furniture store may not be able to move the bed frame or the wardrobe to make them adjacent to each other.

Aspects presented herein provide a virtual showroom system and method that facilitates users to arrange showcase items of interest in different virtual environments and settings. Aspects presented herein also provide a virtual retail system and method that improves online shopping by enable users to view items of interest in 3D views and in different colors, sizes, materials, and/or models. Aspects presented herein may enable users to arrange items of interest in different virtual environments and settings, such that the users may be able to visualize how different items match with each other in different environments. Aspects presented herein may further enable users to place items of interest in a 3D room, and to check out the items based on the items displayed in the 3D room.

FIGS. 1 to 9 is a diagram 100 illustrating an example online virtual retail store purchase flow in accordance with various aspects of the present disclosure. The numberings associated with the diagram 100 do not specify a particular temporal order and are merely used as references for the diagram 100. While the example shows the online virtual retail store is associated with furniture, aspects of the present disclosure may also apply to other types of retail stores and products (e.g., a grocery store, a clothing store, a home equipment store, etc.).

In one aspect of the present disclosure, an online virtual retail store 150 is provided to users (e.g., shoppers, consumers, etc.), where the online virtual retail store 150 may be accessed by users via a web browser (e.g., by using a desktop computer, a laptop computer, a tablet computer, etc.) or via a mobile application (e.g., by using a mobile phone, a tablet computer, etc.). For example, a user may access the online virtual retail store 150 by entering a website associated with the online virtual retail store 150 (e.g., by a Uniform Resource Locator (URL)) to a website browser, or the user may download a mobile application associated with the online virtual retail store 150 from an application store.

As shown at 102 on FIG. 1, after a user accesses the online virtual retail store 150 or after the user is directed to one of the pages of the online virtual retail store 150's website, the online virtual retail store 150 may provide the user with an option to select a scene 120 from a plurality of scenes, where the scene 120 may be associated with item(s) in which the user is looking for, and the scene 120 may be in 3D or at least partially 3D. For example, if the online virtual retail store 150 is for furniture, the online virtual retail store 150 may provide different types of rooms for the user to select, such as a dining room, an office room, a kitchen, a bathroom, a kids' bedroom, and/or a living room, etc. Each room may be configured to provide furniture associated with or related to the room. For example, a dining room scene may provide furniture associated with or related to a dining room, such as dining tables, dining chairs, lamps, etc. Each room and its associated items may be displayed in 3D or at least partially 3D.

Figure 10:
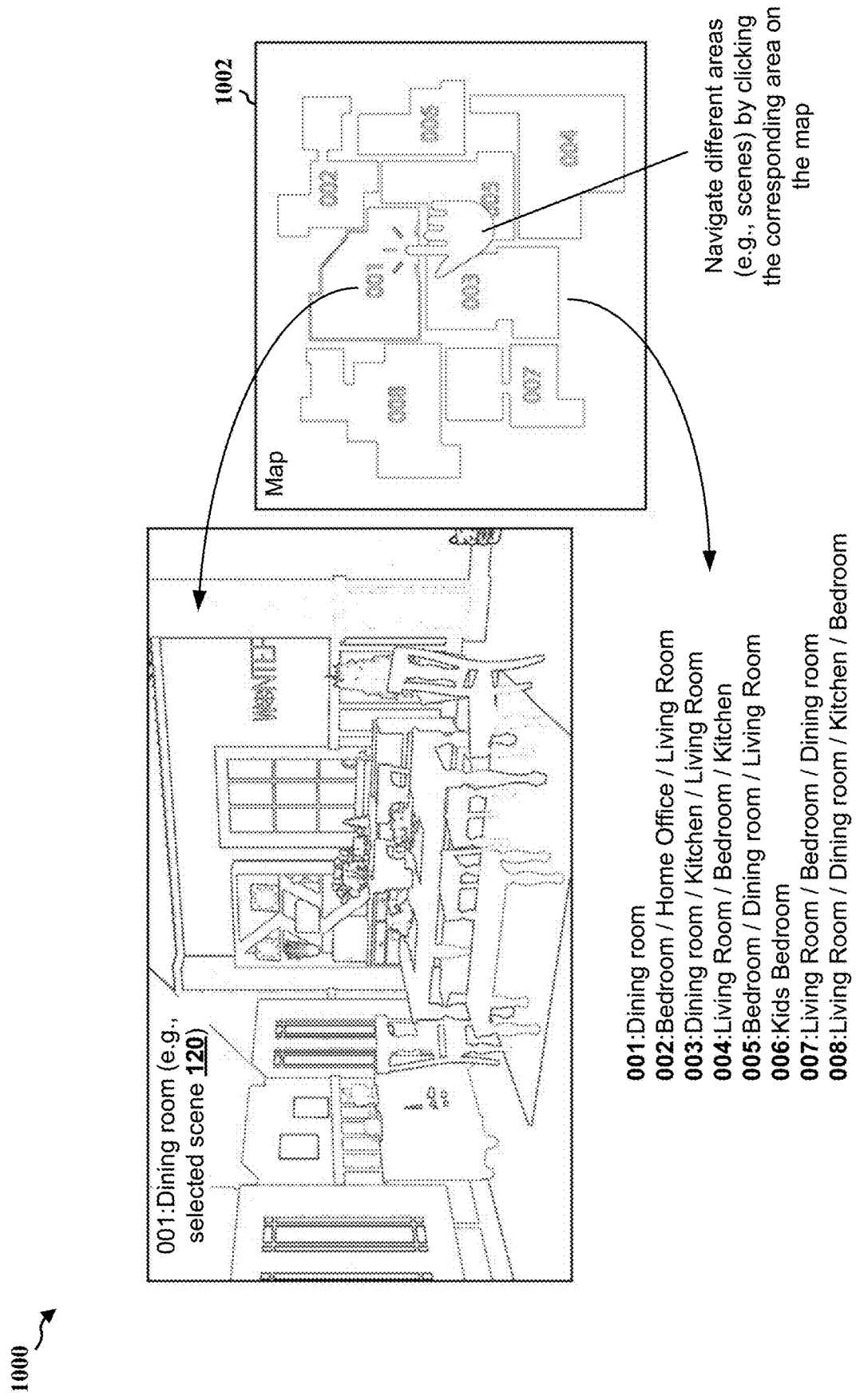
FIG. 10 a diagram illustrating an example navigation map for an online virtual retail store in accordance with various aspects of the present disclosure.

In one example, as shown by a diagram 1000 on FIG. 10, the online virtual retail store 150 may enable the user to select the scene 120 via a map, where the map may include multiple regions that correspond to the plurality of scenes. Thus, a user may select a scene by clicking a corresponding region on the map. For example, as shown at 1002, a map may include multiple types of room, where a label for each room may be provided to the user (e.g., 001 corresponds to dining room, 002 corresponds to bedroom/home office/ living room, etc.). As such, if the user wants to select a dining room for the scene 120, the user may click the corresponding region (e.g., 001) on the map.

Figure 2:
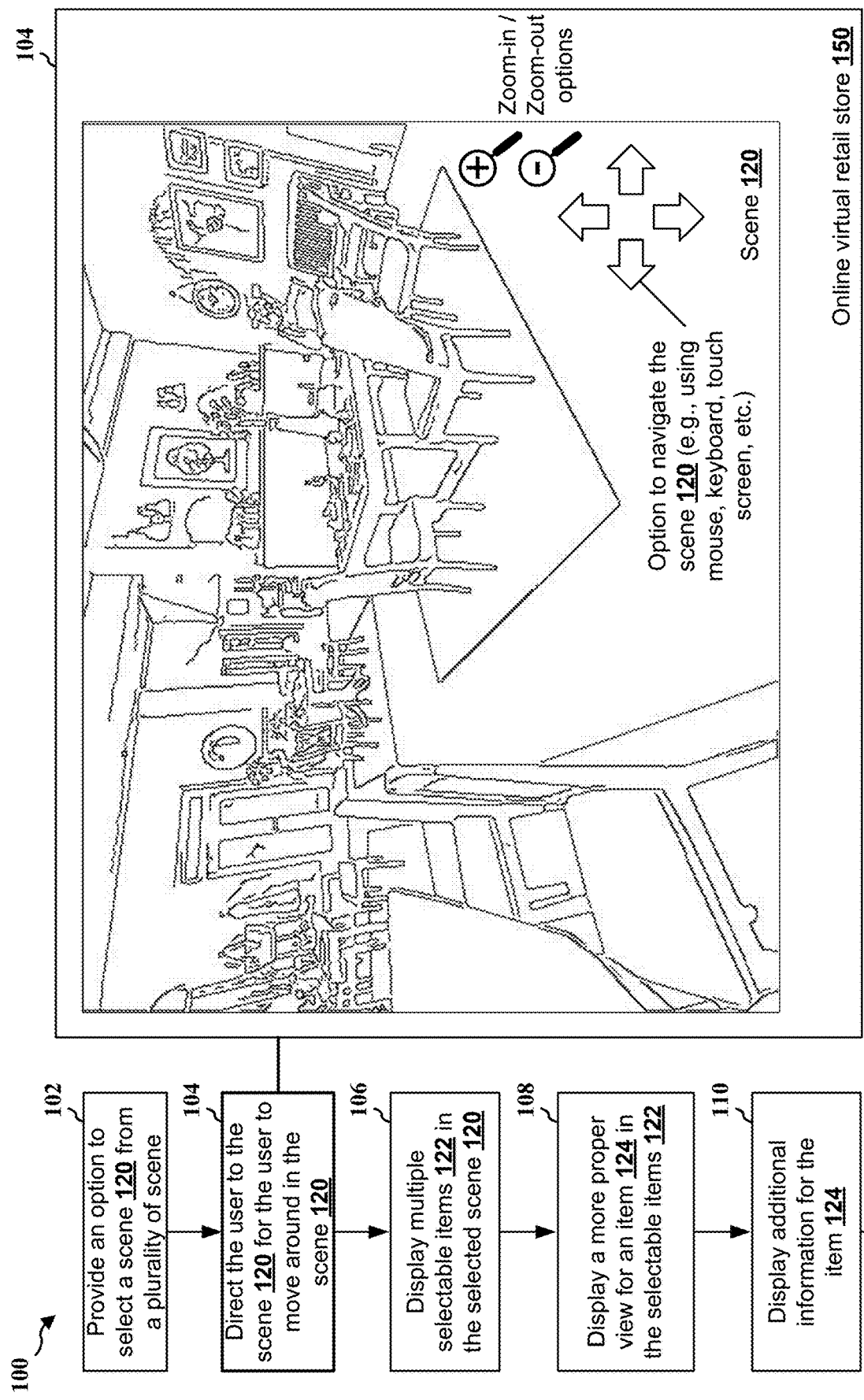
FIG. 2 a diagram illustrating an example online virtual retail store purchase flow in accordance with various aspects of the present disclosure.

As shown at 104 on FIG. 2, after the user selects the scene 120, the online virtual retail store 150 may direct the user to the scene 120 that includes (e.g., displays) multiple objects associated with the scene 120, where the user may move around virtually in the scene 120 viewing the multiple objects in a 3D setting or in a partially 3D setting. For example, if the scene 120 is associated with a dining room, the user may be directed to a dining room that displays multiple objects associated with a dining room, such as dining room furniture items, dining room decorations, dining room fixtures, utensils, etc. In some examples, the scene 120 and its associated objects may be configured to have an one to one (1:1) scale, such that the user may be able to visualize objects in the scene 120 as actual objects in an actual physical space. While in the selected scene 120, the user may move up, down, left, right, high, low, zoom-in, and/or zoom-out in the selected scene 120 (e.g., by controlling a mouse, a keyboard, or a touch screen, etc.).

Figure 3:
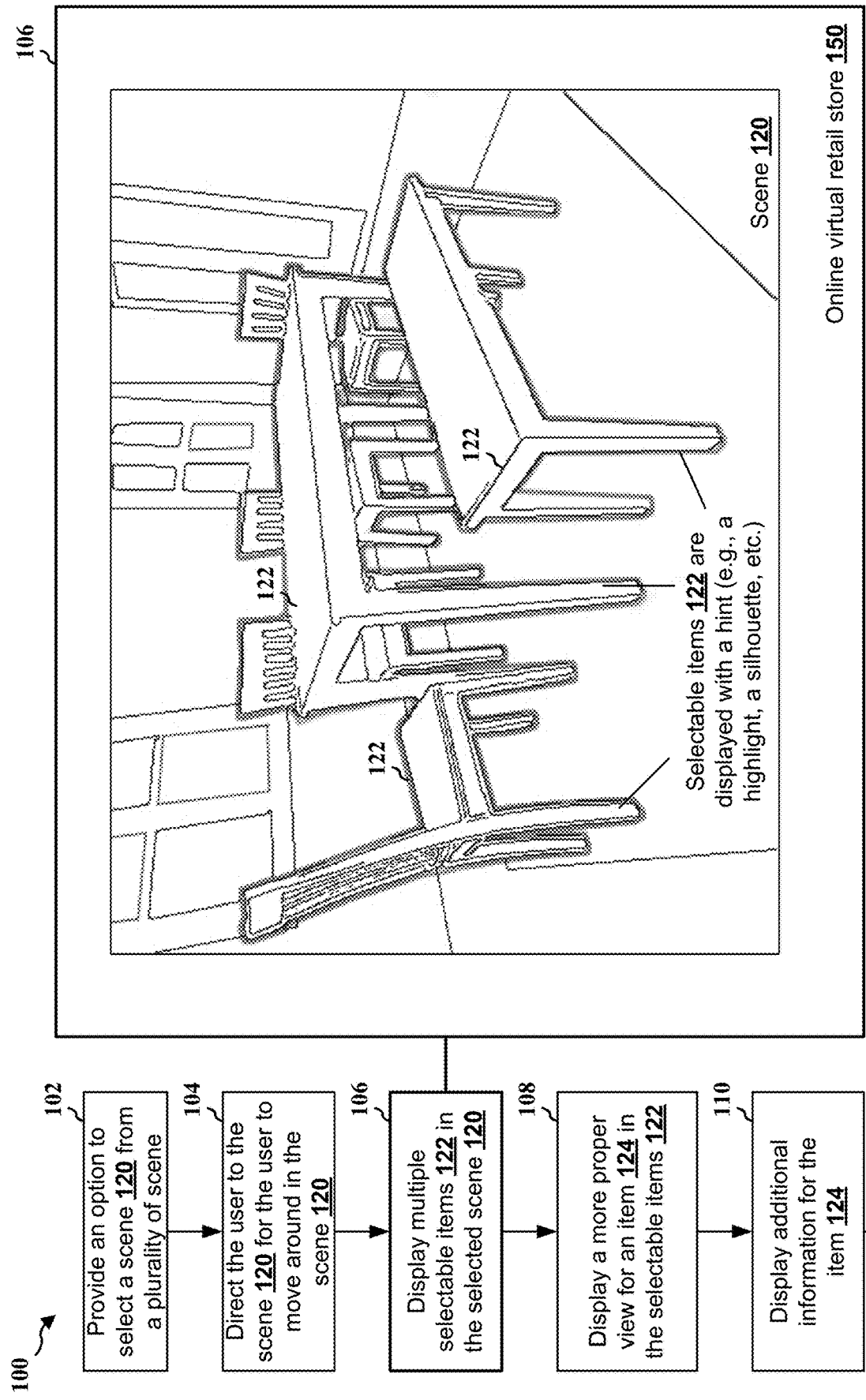
FIG. 3 a diagram illustrating an example online virtual retail store purchase flow in accordance with various aspects of the present disclosure.

As shown at 106 on FIG. 3, while the user is moving around the selected scene 120, the online virtual retail store 150 may indicate one or more selectable items 122 (or clickable items) to the user, where the one or more selectable items 122 may be associated with products that are for sale. In other words, the online virtual retail store 150 may indicate to the user item(s) in which the user may purchase by displaying these items with a hint, such as a colored silhouette, a highlight, a notification, a description, and/or a shading/color specific to purchasable items, etc. For example, while the user is moving around a dining room, multiple furniture items such as dining tables and dining chairs that are for sale by the online virtual retail store 150 may be displayed with a colored silhouette, such that the user may be aware that these items are purchasable/clickable items. In other examples, the online virtual retail store 150 may be configured to display the one or more selectable items 122 with the hint after the user stays at a page unmoving for a specified duration or clicks at a page for a specified duration. For example, if the user moves to a dining table set in a dining room and stops there for x seconds (e.g., 2 seconds) or clicks and holds its mouse or touch screen for y seconds (e.g., 3 seconds), the online virtual retail store 150 may highlight purchasable items in the dining room with a noticeable colored silhouette, such that the user may be made aware which items are purchasable.

Figure 4:
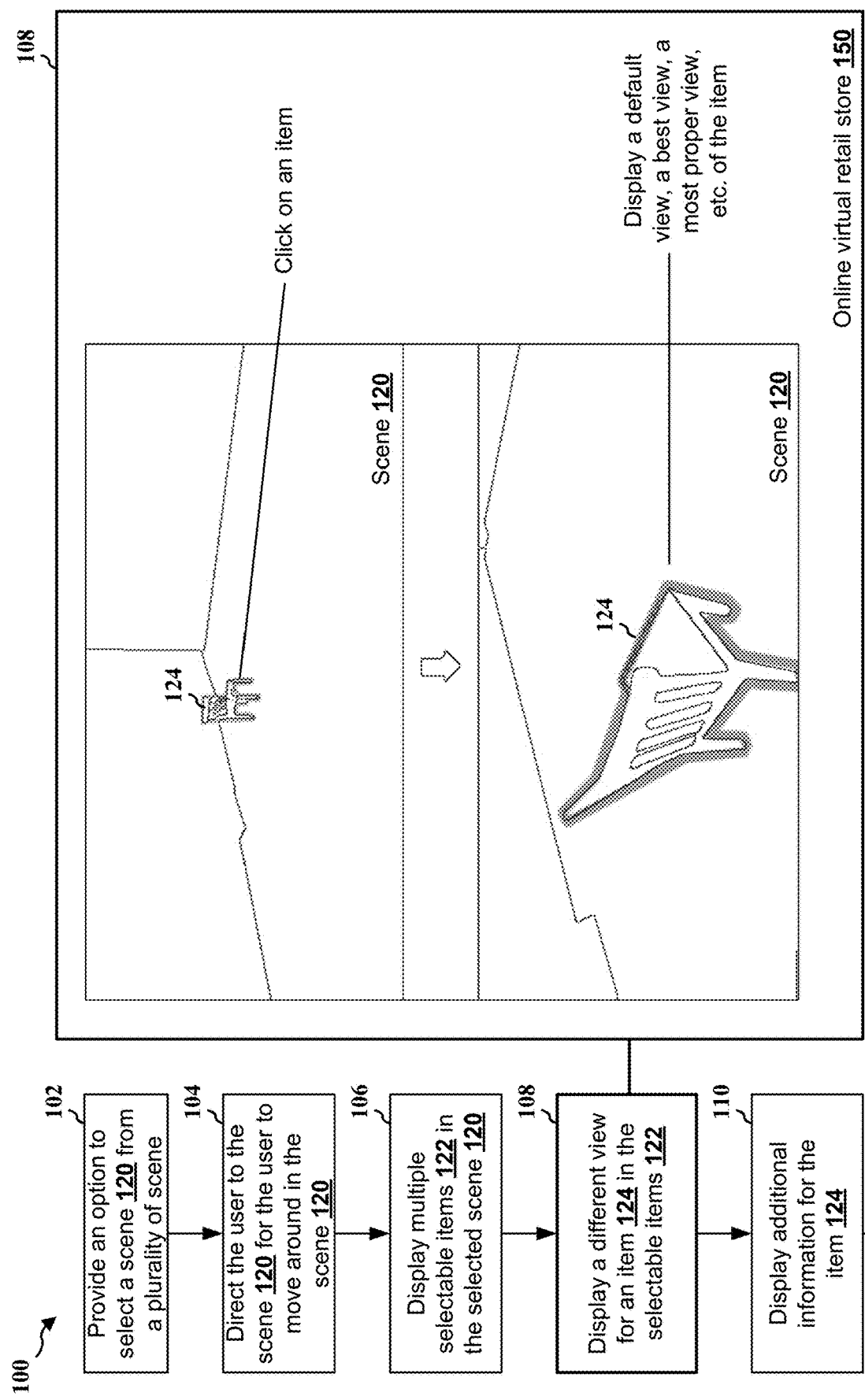
FIG. 4 a diagram illustrating an example online virtual retail store purchase flow in accordance with various aspects of the present disclosure.

In some examples, as shown at 108 on FIG. 4, if the user selects an item 124 from the one or more selectable items 122, the online virtual retail store 150 may display the item 124 with a different view, such as to a default view, a more proper view, or a best view, etc. For example, when the user selects a chair of a dining table set (e.g., by clicking a mouse button when the mouse cursor is on the chair or touching the chair on a touch screen), the camera or perspective of the online virtual retail store 150 may move across the space to one or more anchor location(s) with respect to the chair that allows the user to view the chair from one or more different camera angles or perspectives, including, e.g., a default or best view, which may be pre-selected. In certain examples, this may also involve moving and/or rearranging the item 124 with respect to the selected scene 120. In other words, the online virtual retail store 150 may provide the user with a zoom-in 3D view of the chair, such that the user may have a closer look at the chair.

Figure 5:
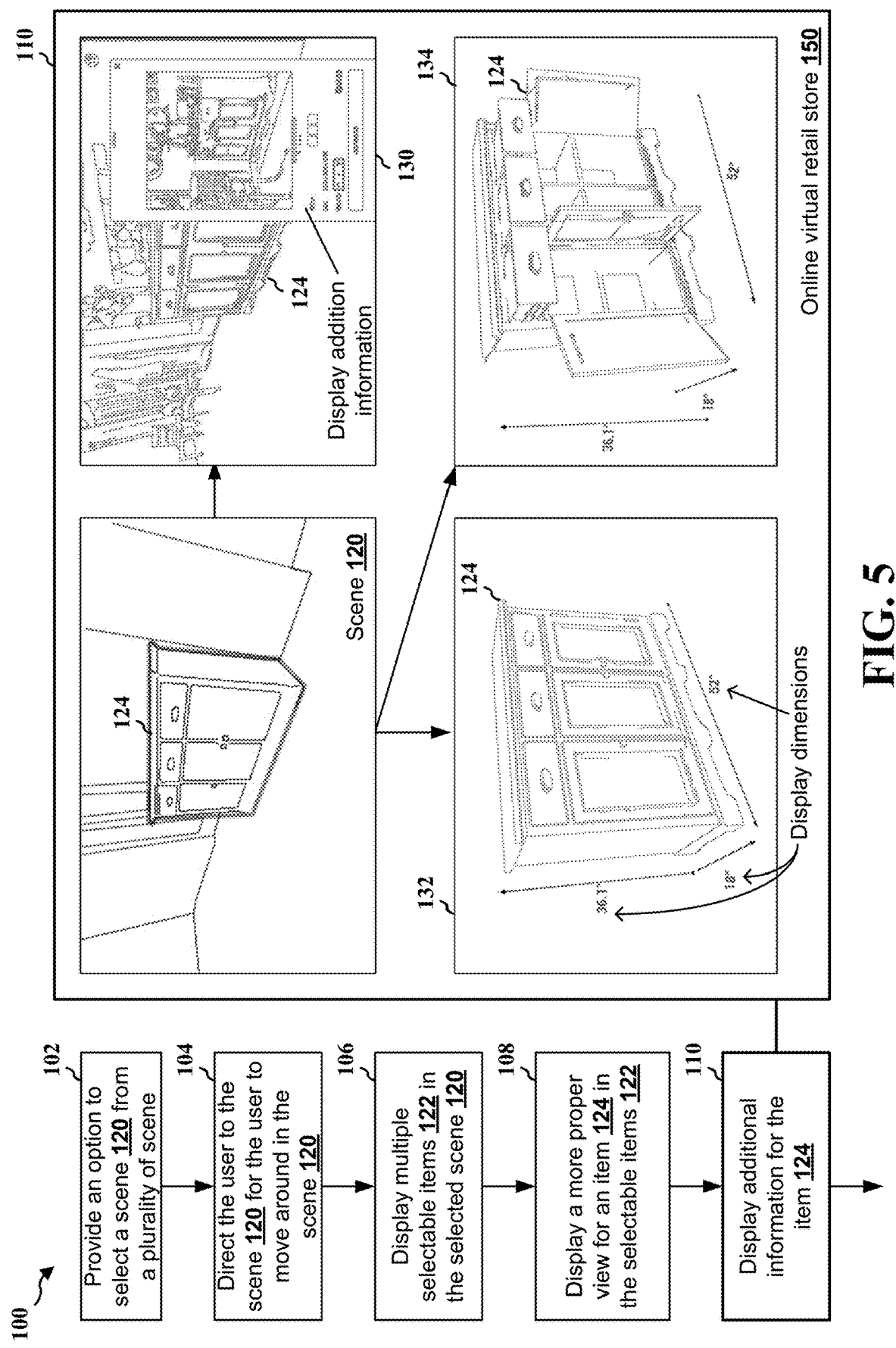
FIG. 5 a diagram illustrating an example online virtual retail store purchase flow in accordance with various aspects of the present disclosure.

In other examples, as shown at 110 on FIG. 5, if the user selects an item 124 from the one or more selectable items 122, the online virtual retail store 150 may display additional information for the item 124. For example, as shown at 130, if the user selects a cabinet (or a server), the online virtual retail store 150 may provide the user with additional information for the cabinet, which may include a model number, a description (e.g., an antique black and oak finish server), a size, a list of available colors, a list of available textures, video(s), photo(s), and/or a price associated with the cabinet. In another example, after the user selects (e.g., clicks on) the cabinet, the size of the cabinet may be displayed in detail such as shown at 132 (e.g., by clicking or touching an icon specific to showing the size of an item). In another example, as shown at 134, the online virtual retail store 150 may provide the user with one or more alternative views of the cabinet, such as the interiors of the cabinet or the cabinet with its drawers and doors open (e.g., by clicking or touching an icon specific to showing the interior of an item). In another example, the online virtual retail store 150 may enable the user to move or rotate the cabinet to see different views (e.g., 3D views) of the cabinet. In another example, if the cabinet is associated with an animation, the online virtual retail store 150 may enable the user to play the animation (e.g., such as by clicking a play option). In another example, if the user selects a different color, a different model, and/or a different texture for the selected item 124, the online virtual retail store 150 may display/update the selected item 124 with the color, model, and/or texture selected by the user. In another example, for the user to access the additional information for the item 124, the online virtual retail store 150 may display an icon beside the item 124 (e.g., an icon specific to display additional information). Such that when the user clicks or touches the icon, the online virtual retail store 150 may provide a slide-up panel with the additional information and with the option to change to a different color/texture may pop up.

Figure 6:
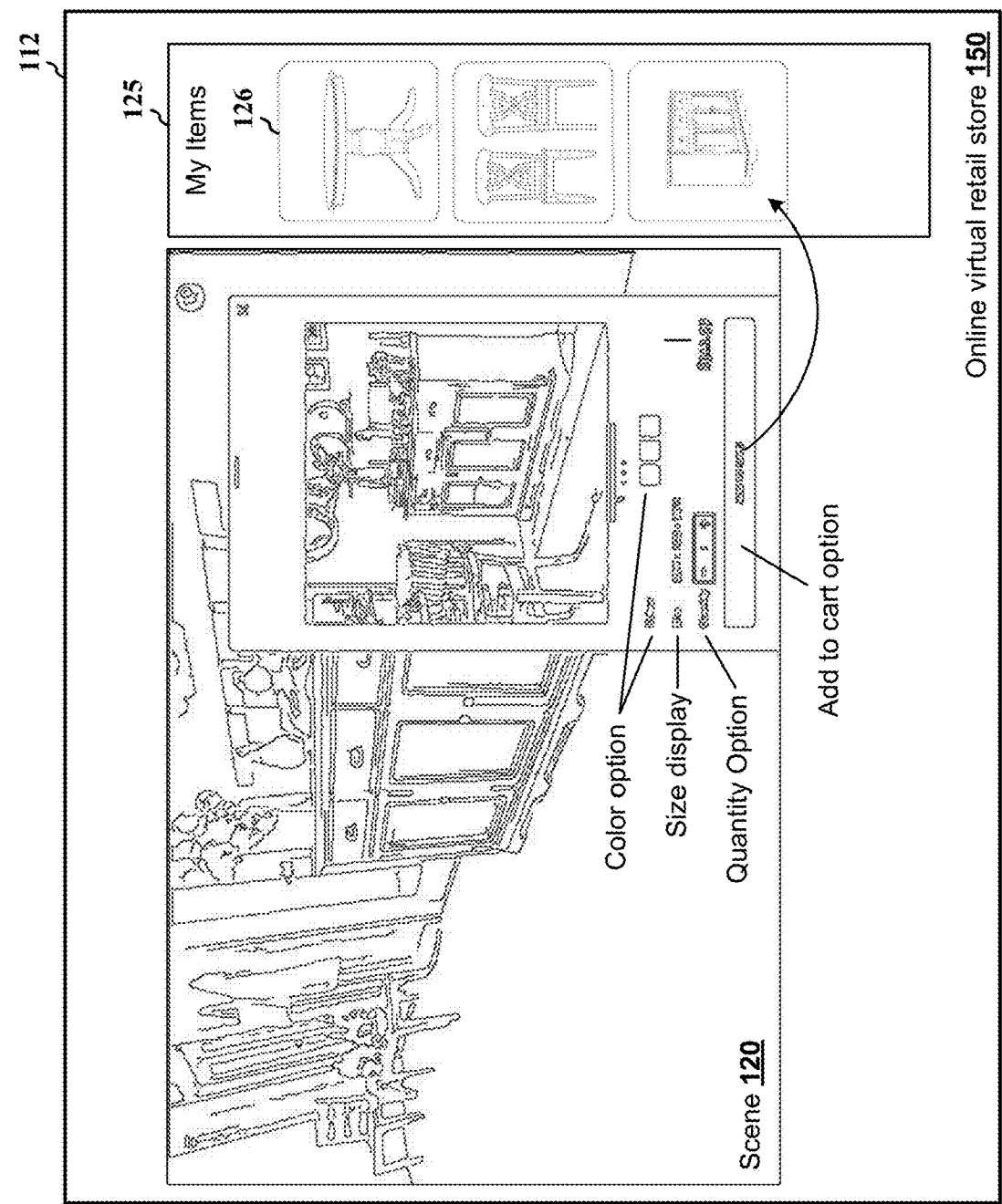
FIG. 6 a diagram illustrating an example online virtual retail store purchase flow in accordance with various aspects of the present disclosure.

As shown at 112 on FIG. 6, while the user is browsing the selected scene 120, the online virtual retail store 150 may enable the user to add one or more items 126 from the selectable items 122 to a shopping cart 125 (e.g., add the one or more items 126 to a list, which may be a subset). For example, if the user is browsing a cabinet and has an interest in the cabinet, the user may move/place the cabinet to a shopping cart or a temporary purchasing list (e.g., a wish list) by clicking an "add to cart" option. The shopping cart may include multiple items, such as other items in which the user wants to purchase (e.g., a table, a chair, etc.).

Figure 7:
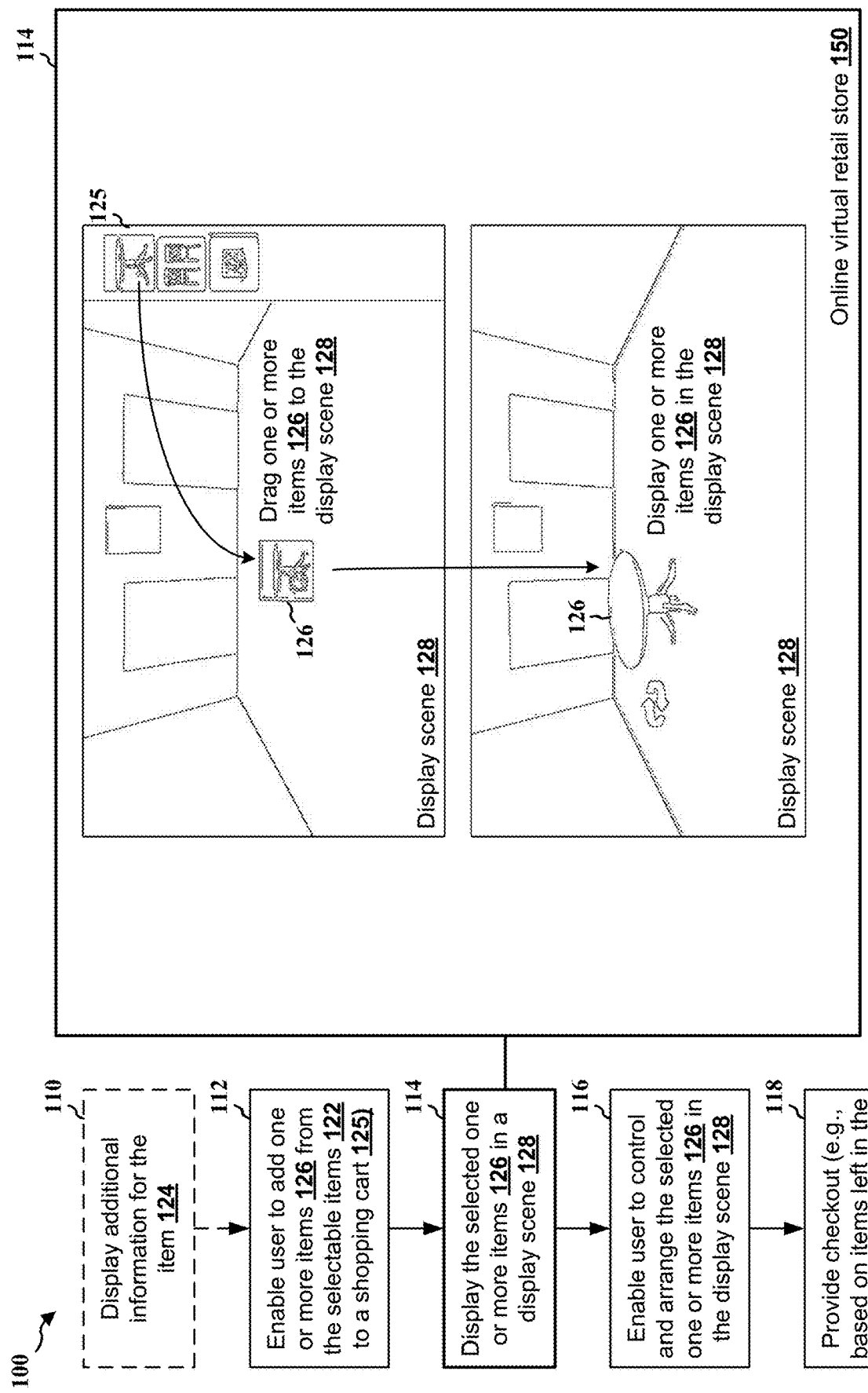
FIG. 7 a diagram illustrating an example online virtual retail store purchase flow in accordance with various aspects of the present disclosure.

As shown at 114 on FIG. 7, after the user adds one or more items 126 to the shopping cart 125, the online virtual retail store 150 may enable the user to view at least part of the one or more items 126 in a display scene 128. The display scene 128 may be another 3D scene or at least partially 3D scene that is different from the scene 120. For example, the display scene 128 may be an empty dining room chosen from different styles of empty dining rooms, where the user may place and view one or more of the items selected by the user (e.g., a cabinet, a table, and a chair, etc.) in the selected dining room. In another example, if the user wants to view the one or more items 126 in the display scene 128, the online virtual retail store 150 may provide the user with a list of icons/thumbnails that is associated with the one or more items 126, such that the user may drag the icon or the thumbnail of an item to be displayed in the display scene 128. Similarly, the online virtual retail store 150 may provide the user with an option to remove one or more selected items from the display scene 128, such as by enable the user to drag a selected item away from the display scene 128, or by providing a remove/delete icon beside a selected item.

Figure 8:
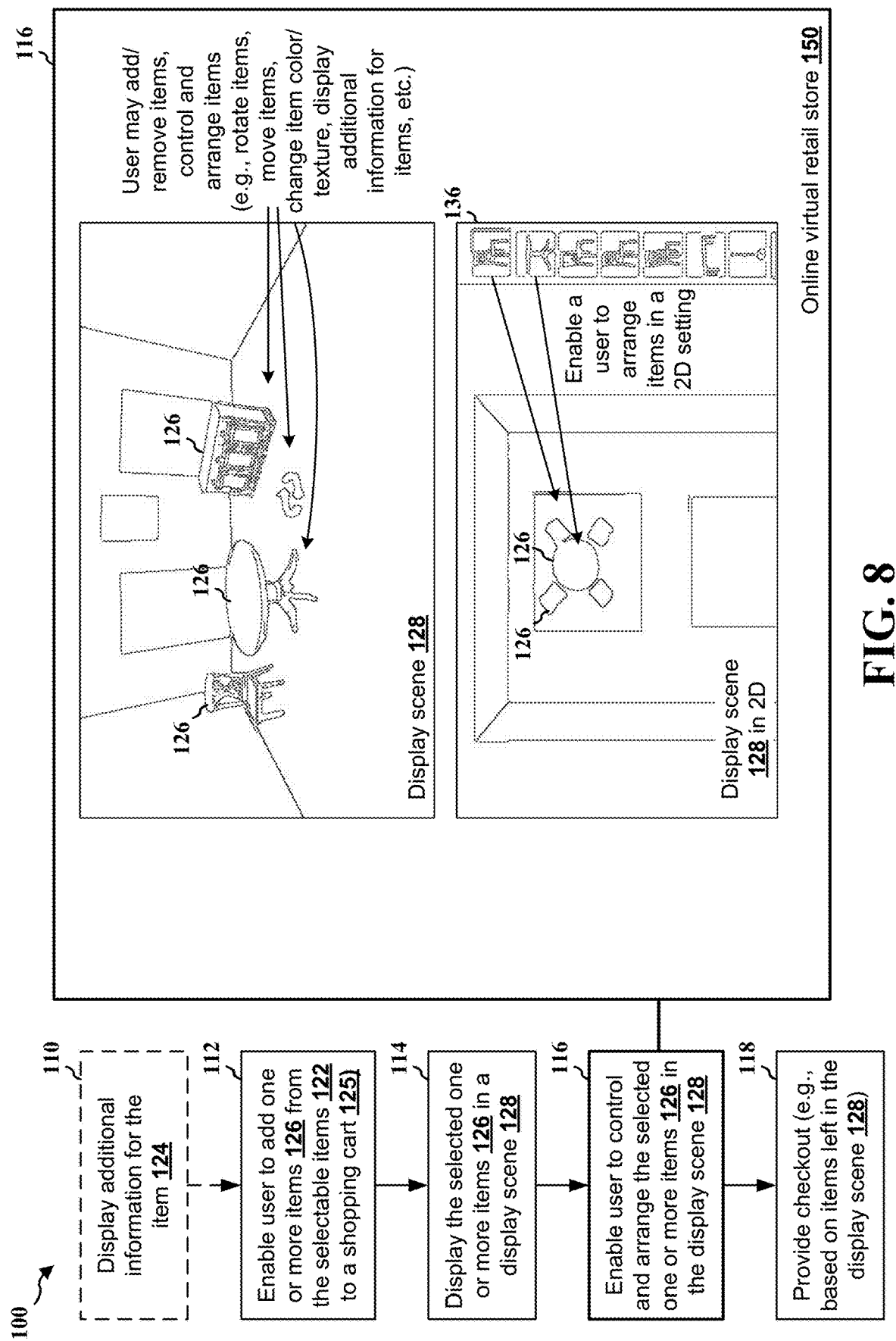
FIG. 8 a diagram illustrating an example online virtual retail store purchase flow in accordance with various aspects of the present disclosure.

As shown at 116 on FIG. 8, the online virtual retail store 150 may further enable the user to control and arrange the one or more items 126. For example, if the user places a table in the display scene 128, the user may be able to rotate, move, change, and/or obtain additional information for the table in the display scene 128. In some examples, the online virtual retail store 150 may additionally provide a two-dimensional (2D) version of the display scene. Thus, if the user selects the 2D version of the display scene 128, the user may be able to arrange the one or more items 126 under a 2D setting, such as shown at 136. In other examples, the online virtual retail store 150 may additionally provide the user with an option to reset the camera view or to move the one or more items 126 to a default location. In other examples, the online virtual retail store 150 may provide the user with an option to remove all of the one or more items 126 from the display scene 128 (the one or more items may still remain in the shopping cart). In some examples, the online virtual retail store 150 may enable the user to interact with a furniture item. For example, a user may pull a drawer of a cabinet, or add/remove/replace a cushion from chair, etc.

In one aspect of the present disclosure, the online virtual retail store 150 may provide the user with a search option, where the user may search for an item when the user is in the display scene 128 and/or when the user is in the selected scene 120. For example, a search bar may be allocated on the display scene 128/the selected scene 120 to enable the user to enter a key search word/phrase for items (e.g., the description of the item, the brand of the item, etc.) the user wants to add to the display scene 128 and/or to the shopping cart 125. In one example, if a user types a search word/phrase, an auto-suggestion may be displayed for the user. After the user inputs the search word/phrase, the online virtual retail store 150 may display a list of items that are associated with the search word/phrase. For example, if the user enters a key phrase "wooden chair" in the search bar, the online virtual retail store 150 may display a search result that shows a list of furniture items that includes or is associated with the description "wooden chair." Then, the user may place one or more items from the search result to the display scene 128 and/or to the shopping cart 125. As such, in arranging the one or more items 126 in the display scene 128, if the user wants to include additional items that are not in the shopping cart 125, the user may add such items via the search option.

In another aspect of the present disclosure, the scene 120 and/or the display scene 128 may be rendered with a real-time environment configuration. For example, the scene 120 and/or the display scene 128 may display snow falling outside of a window or fan blades turning and reflect on the wall mirror, etc.

Figure 9:
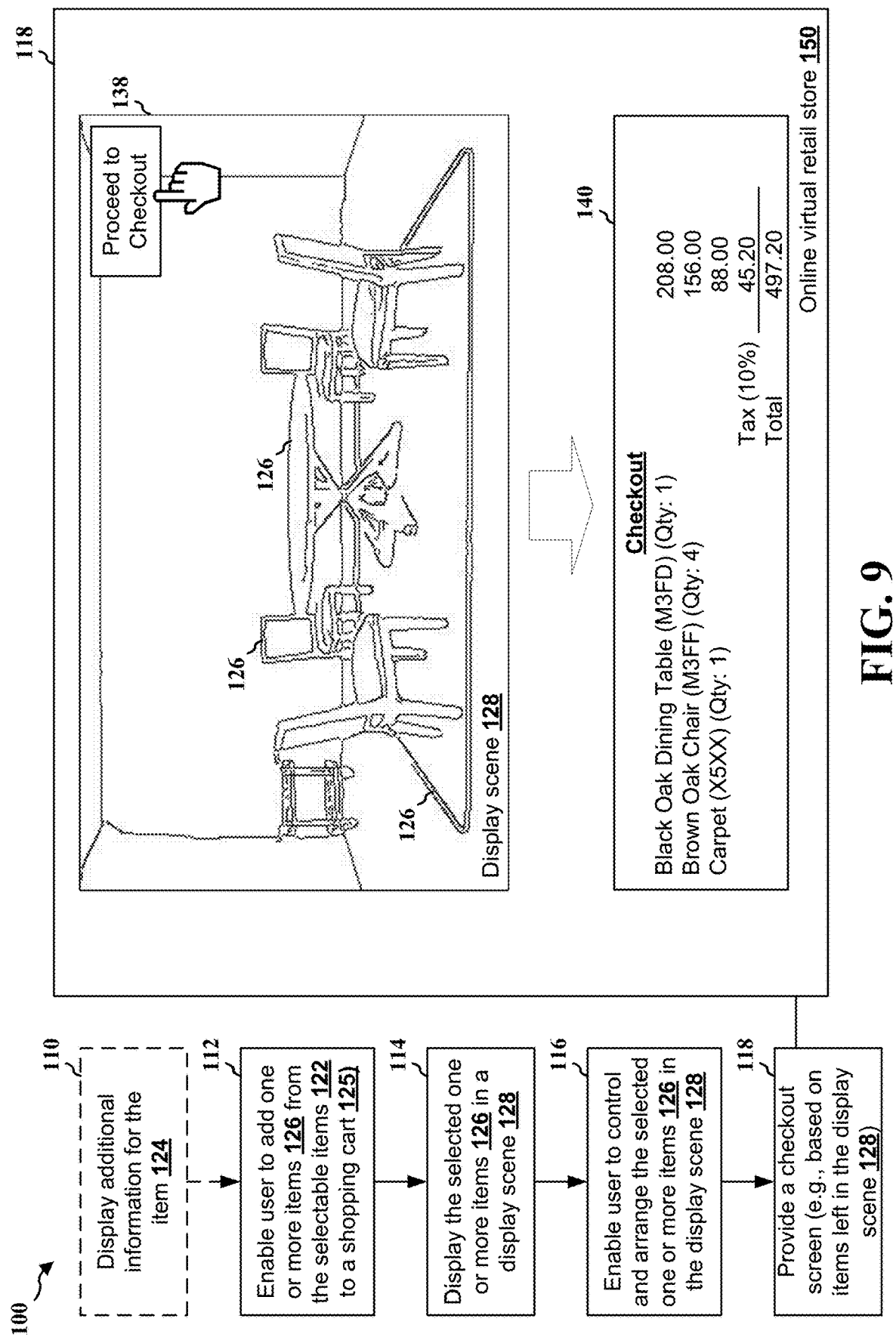
FIG. 9 a diagram illustrating an example online virtual retail store purchase flow in accordance with various aspects of the present disclosure.

As shown at 118 on FIG. 9, after the user decides items to be purchased, the online virtual retail store 150 may provide a checkout screen that enables the user to check out items to be purchased. The checkout screen may display prices for the items to be purchased, the tax if applicable, and/or the total price for the items to be purchased, etc. The user may then make a payment based on the displayed total price via the online virtual retail store 150. In one example, the user may be able to check out the purchased items by putting (or leaving) the purchased items on the display scene 128. For example, as shown at 138, after a user places a table, four chairs, and a carpet in a display scene (e.g., the display scene 128), the user may proceed to the checkout (e.g., by click an icon or a selection associated with checkout). Then, the online virtual retail store 150 may direct the user to a checkout screen such as shown at 140. As such, the user may have a visual view for the items purchased instead of a list view.

Figure 11:
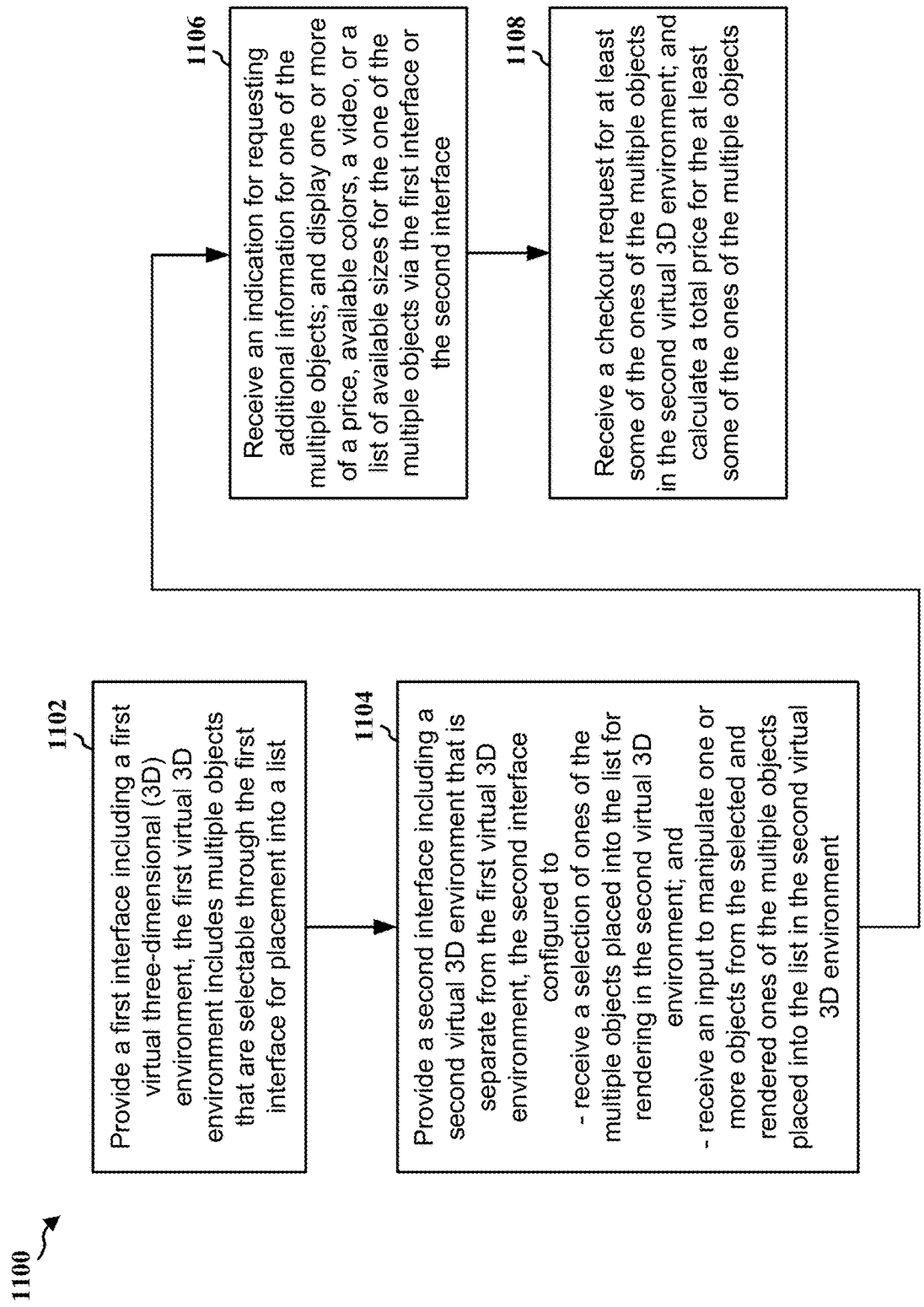
FIG. 11 is a flowchart of a method for implementing a virtual showroom system.

FIG. 11 is a flowchart 1100 of a method for implementing a virtual showroom system. The method may be performed by an online virtual retail store or a component of an online virtual retail store (e.g., the online virtual retail store 150; the apparatus 1202; a processing system, which may include a memory). The online virtual retail store may be operated on a computer, a computer server, and/or a mobile device, etc., and the online virtual retail store may be associated with a website, a software, or a mobile device application, etc. The method may enable the online virtual retail store to provide users with different 3D virtual environments to arrange items of interest, such that the users may be able to visualize how different items match with each other in different environments.

At 1102, the online virtual retail store may provide a first interface including a first virtual 3D environment, the first virtual 3D environment may include multiple objects that are selectable through the first interface for placement into a list, such as described in connection with FIGS. 1 to 3. For example, at 102, 104, and 106, the online virtual retail store 150 may enable a user to select a scene 120 that provides a first 3D environment, where the scene 120 may include multiple selectable items 122 that are selectable for placement into a shopping cart 125. The provision of the first interface may be performed by, e.g., the first 3D interface generation component 1240 of the apparatus 1202 in FIG. 12. In one example, the multiple objects may be representations of underlying physical objects for sale. In another example, the underlying physical objects may be associated with furniture. In another example, the list may correspond to a shopping cart.

At 1104, the online virtual retail store may provide a second interface including a second virtual 3D environment that is separate from the first virtual 3D environment, the second interface may be configured to: receive a selection of ones of the multiple objects placed into the list for rendering in the second virtual 3D environment; and receive an input to manipulate one or more objects from the selected and rendered ones of the multiple objects placed into the list in the second virtual 3D environment, such as described in connection with FIGS. 6 to 8. For example, at 112, 114, and 116, the online virtual retail store 150 may enable a user to add one or more items 126 from the selectable items 122 to a shopping cart 125. Then, the user may view the one or more items 126 in a display scene 128, where the display scene 128 may be a second virtual 3D environment that is different from the scene 120 (e.g., the first virtual 3D environment). Within the display scene 128, the user may control and arrange the one or more items 126. The provision of the second interface may be performed by, e.g., the second 3D interface generation component 1242 and/or the first 3D interface generation component 1240 of the apparatus 1202 in FIG. 12. The second virtual 3D environment may be a simulation environment for the selected and rendered ones of the multiple objects In one example, for the input to manipulate the one or more objects from the selected and rendered ones of the multiple ones of the objects placed into the list corresponding to arranging a position of the one or more objects, the second interface may further be configured to change the position of the one or more objects in the second virtual 3D environment, such as described in connection with FIG. 8. In another example, for the input to manipulate the one or more objects from the selected and rendered ones of the multiple ones of the objects placed into the list corresponding to changing a color or a display of the one or more objects, the second interface may further be configured to change the color or the display of the one or more objects in the second virtual 3D environment, such as described in connection with FIG. 8. In another example, for the input to manipulate the one or more objects from the selected and rendered ones of the multiple ones of the objects placed into the list corresponding to operating one or more furniture associated functions, the second interface may further be configured to operate the one or more furniture associated functions on the one or more objects.

In one example, at least one of the first interface or the second interface may include a keyword search interface configured to return corresponding one or more objects responsive to a keyword search input. In such an example, a selection of the corresponding one or more objects may change a perspective view of the at least one of the first interface or the second interface to display the selection of the corresponding one or more objects. In such an example, for the corresponding one or more objects responsive to the keyword search input not belonging to the multiple objects that are selectable through the first interface, a selection of the one or more objects may cause a third 3D environment to be generated with the one or more objects, the third 3D environment being different than the first 3D environment.

At 1106, the online virtual retail store may receive an indication for requesting additional information for one of the multiple objects; and display one or more of a price, available colors, a video, or a list of available sizes for the one of the multiple objects via the first interface or the second interface, such as described in connection with FIG. 5. For example, at 110, if the user selects an item 124 from the one or more selectable items 122, the online virtual retail store 150 may display additional information for the item 124, which may include a model number, a description, a size, a list of available colors, a list of available textures, video(s), photo(s), and/or a price associated with the item 124. The reception of the indication and the display of one or more of a price, available colors, a video, or a list of available sizes for the one of the multiple objects may be performed by, e.g., the information process component 1244 and/or the reception component 1230 of the apparatus 1202 in FIG. 12.

At 1108, the online virtual retail store may receive a checkout request for at least some of the ones of the multiple objects in the second virtual 3D environment; and calculate a total price for the at least some of the ones of the multiple objects, such as described in connection with FIGS. 1 to 9. For example, at 118, after the user decides items to be purchased, online virtual retail store 150 direct the user to a checkout screen that displays prices for the items to be purchased, the tax if application, and the total price for the items to be purchased, etc. The reception of the checkout request and the calculation of the total price may be performed by, e.g., the price calculation component 1246 and/or the reception component 1230 of the apparatus 1202 in FIG. 12.

Figure 12:
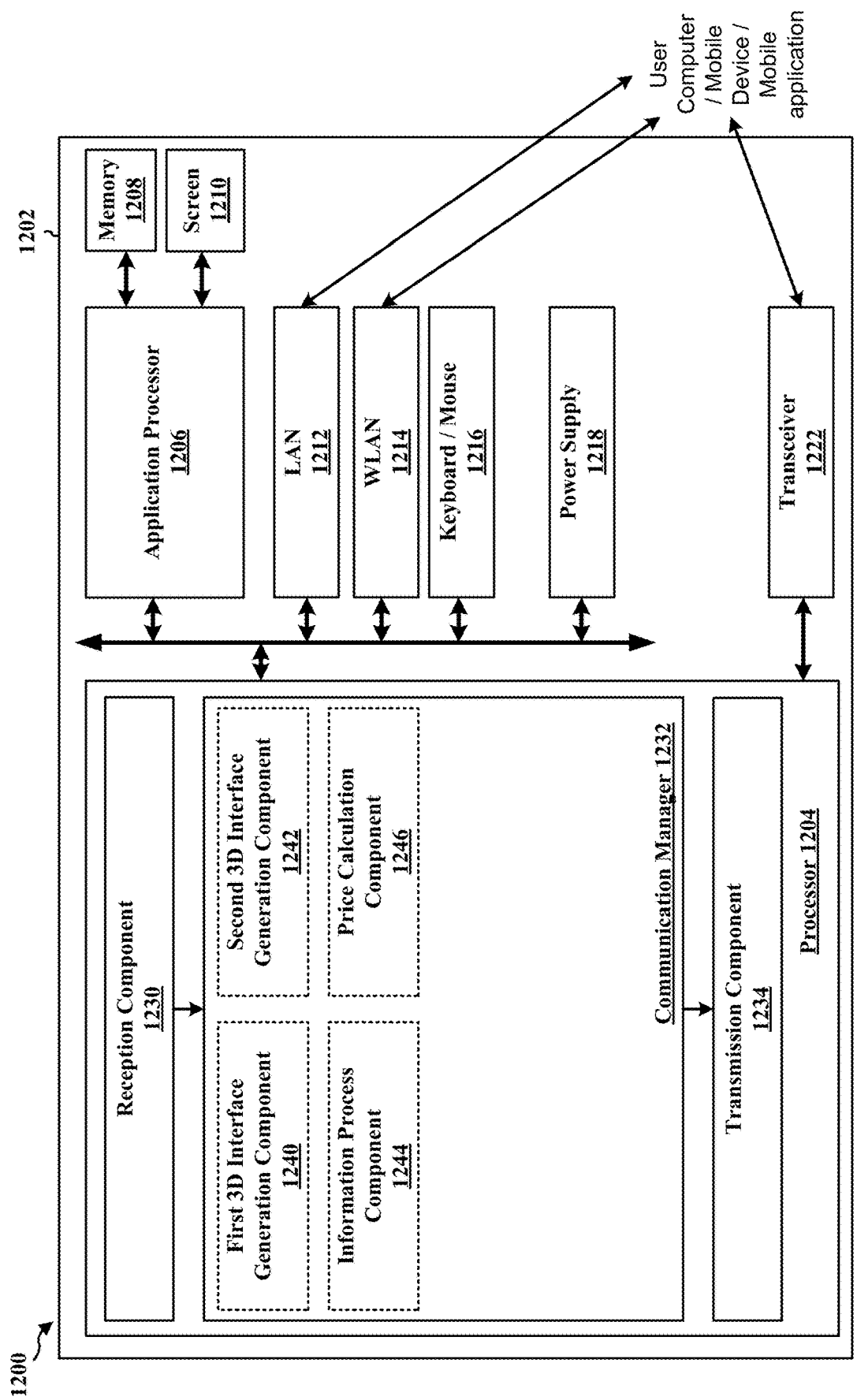
FIG. 12 is a diagram illustrating an example of a hardware implementation for an example apparatus.

FIG. 12 is a diagram 1200 illustrating an example of a hardware implementation for an apparatus 1202. The apparatus 1202 may be a computer/computer server, a component of a computer/computer server, or may implement computer/computer server functionality. In some aspects, the apparatus 1202 may include a processor 1204 (which may also refer to as a modem) coupled to a transceiver 1222. In some aspects, the apparatus 1202 may further include an application processor 1206 coupled to a memory 1208 and a screen 1210, a wireless local area network (WLAN) module 1214 and/or a local area network (LAN) module 1212, a keyboard/mouse 1216, or a power supply 1218. The processor 1204 communicates through the transceiver 1222 with a user accessing the computer (e.g., via the user's computer/laptop, the user's mobile device, a mobile application, a software, etc.). The processor 1204 may include a computer-readable medium/memory. The computer-readable medium/memory may be non-transitory. The processor 1204 is responsible for general processing, including the execution of software stored on the computer-readable medium/memory. The software, when executed by the processor 1204, causes the processor 1204 to perform the various functions described supra. The computer-readable medium/memory may also be used for storing data that is manipulated by the processor 1204 when executing software. The processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the processor 1204. In one configuration, the apparatus 1202 may be a modem chip and include just the processor 1204, and in another configuration, the apparatus 1202 may be the computer/computer server and include the additional modules of the apparatus 1202.

The communication manager 1232 includes a first 3D interface generation component 1240 that is configured to provide a first interface including a first virtual 3D environment, the first virtual 3D environment including multiple objects that are selectable through the first interface for placement into a list, e.g., as described in connection with 1102 of FIG. 11. The communication manager 1232 further includes a second 3D interface generation component 1242 that is configured to provide a second interface including a second virtual 3D environment that is separate from the first virtual 3D environment, the second interface configured to receive a selection of ones of the multiple objects placed into the list for rendering in the second virtual 3D environment; and receive an input to manipulate one or more objects from the selected and rendered ones of the multiple objects placed into the list in the second virtual 3D environment, e.g., as described in connection with 1104 of FIG. 11. The communication manager 1232 further includes an information process component 1244 that is configured to receive an indication for requesting additional information for one of the multiple objects; and display one or more of a price, available colors, a video, or a list of available sizes for the one of the multiple objects via the first interface or the second interface, e.g., as described in connection with 1106 of FIG. 11. The communication manager 1232 further includes a price calculation component 1246 that is configured to receive a checkout request for at least some of the ones of the multiple objects in the second virtual 3D environment; and calculate a total price for the at least some of the ones of the multiple objects, e.g., as described in connection with 1108 of FIG. 11.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the processor 1204, includes means for providing a first interface including a first virtual 3D environment, the first virtual 3D environment including multiple objects that are selectable through the first interface for placement into a list (e.g., the first 3D interface generation component 1240). The apparatus 1202 includes means for providing a second interface including a second virtual 3D environment that is separate from the first virtual 3D environment, the second interface configured to: receive a selection of ones of the multiple objects placed into the list for rendering in the second virtual 3D environment; and receive an input to manipulate one or more objects from the selected and rendered ones of the multiple objects placed into the list in the second virtual 3D environment (e.g., the second 3D interface generation component 1242 and/or the first 3D interface generation component 1240). The apparatus 1202 includes means for receiving an indication for requesting additional information for one of the multiple objects; and means for displaying one or more of a price, available colors, a video, or a list of available sizes for the one of the multiple objects via the first interface or the second interface (e.g., the information process component 1244 and/or the reception component 1230). The apparatus 1202 includes means for receiving a checkout request for at least some of the ones of the multiple objects in the second virtual 3D environment; and means for calculating a total price for the at least some of the ones of the multiple objects (e.g., the price calculation component 1246 and/or the reception component 1230).

The means may be one or more of the components of the apparatus 1202 configured to perform the functions recited by the means. The apparatus 1202 may include a TX Processor, an RX Processor, and/or a controller/processor. As such, in one configuration, the means may be the TX Processor, the RX Processor, and the controller/processor configured to perform the functions recited by the means.

Through the aspects described herein involving a virtual showroom system or virtual retail environment system having a first interface including a first virtual 3D environment, the first virtual 3D environment including multiple objects that are selectable through the first interface for placement into a list; and a second interface including a second virtual 3D environment that is separate from the first virtual 3D environment, the aspects can thereby address the issues in the related art regarding facilitating the physical functionality, dimensions, and other aspects of such objects in a virtual environment to simulate the underlying physical object as if it was in a physical showroom.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for implementing a virtual showroom system, the method including:
    receiving a selection of a room from a plurality of selectable rooms, each of the plurality of selectable rooms preset with a set of multiple furniture objects to be rendered with the each of the plurality of selectable rooms, the set of multiple furniture objects corresponding to a room type represented by the each of the plurality of selectable rooms;
    providing a first interface including a first virtual three-dimensional (3D) environment representative of the selected room, the first virtual 3D environment including the set of multiple furniture objects corresponding to the selected room, the set of multiple furniture objects rendered with the selected room in the first virtual 3D environment, the rendered set of multiple furniture objects being selectable within the first virtual 3D environment through the first interface for placement into a list; and
    providing a second interface including a second virtual 3D environment that is separate from the first virtual 3D environment, the second interface configured to:
        receive a selection of ones of the set of multiple furniture objects placed into the list to render in another room in the second virtual 3D environment, the another room initialized as an empty room; and
        receive an input to manipulate one or more furniture objects from the selected and rendered ones of the set of multiple furniture objects placed into the list in the second virtual 3D environment; and
        for receipt of a selection to proceed to a checkout screen, providing a checkout screen configured to facilitate a purchase of the selected and rendered ones of the set of multiple furniture objects rendered in the another room in the second virtual 3D environment.

2. The method of claim 1, wherein for the input to manipulate the one or more furniture objects from the selected and rendered ones of the set of multiple furniture objects placed into the list corresponding to arranging a position of the one or more furniture objects, the second interface is further configured to change the position of the one or more furniture objects in the second virtual 3D environment.

3. The method of claim 1, wherein for the input to manipulate the one or more furniture objects from the selected and rendered ones of the set of multiple furniture objects placed into the list corresponding to changing a color or a display of the one or more furniture objects, the second interface is further configured to change the color or the display of the one or more furniture objects in the second virtual 3D environment.

4. The method of claim 1, wherein for the input to manipulate the one or more furniture objects from the selected and rendered ones of the set of multiple furniture objects placed into the list corresponding to operating one or more furniture associated functions, the second interface is further configured to operate the one or more furniture associated functions on the one or more furniture objects.

5. The method of claim 1, wherein at least one of the first interface or the second interface includes a keyword search interface configured to return corresponding one or more furniture objects responsive to a keyword search input.

6. The method of claim 5, wherein a selection of the corresponding one or more furniture objects changes a perspective view of the at least one of the first interface or the second interface to display the selection of the corresponding one or more furniture objects.

7. The method of claim 5, wherein for the corresponding one or more furniture objects responsive to the keyword search input not belonging to the multiple furniture objects that are selectable through the first interface, a selection of the one or more furniture objects causes a third 3D environment to be generated with the one or more furniture objects, the third 3D environment being different than the first 3D environment.

8. The method of claim 1, further including:
    receiving an indication for requesting additional information for one of the multiple furniture objects; and
    displaying one or more of available colors, a video, or a list of available sizes for the one of the multiple furniture objects via the first interface or the second interface.

9. A system for implementing a virtual showroom system, including:
    a memory; and
    at least one processor coupled to the memory and configured to:
        receive a selection of a room from a plurality of selectable rooms, each of the plurality of selectable rooms preset with a set of multiple furniture objects to be rendered with the each of the plurality of selectable rooms, the set of multiple furniture objects corresponding to a room type represented by the each of the plurality of selectable rooms;
        provide a first interface including a first virtual three-dimensional (3D) environment representative of the selected room, the first virtual 3D environment including the set of multiple furniture objects corresponding to the selected room, the set of multiple furniture objects rendered with the selected room in the first virtual 3D environment, the rendered set of multiple furniture objects being selectable within the first virtual 3D environment through the first interface for placement into a list; and provide a second interface including a second virtual 3D environment that is separate from the first virtual 3D environment, the second interface configured to:

receive a selection of ones of the set of multiple furniture objects placed into the list to render in another room in the second virtual 3D environment, the another room initialized as an empty room; and receive an input to manipulate one or more furniture objects from the selected and rendered ones of the set of multiple furniture objects placed into the list in the second virtual 3D environment; and for receipt of a selection to proceed to a checkout screen, providing a checkout screen configured to facilitate a purchase of the selected and rendered ones of the set of multiple furniture objects rendered in the another room in the second virtual 3D environment.

10. The system of claim 9, wherein for the input to manipulate the one or more furniture objects from the selected and rendered ones of the set of multiple furniture objects placed into the list corresponding to arranging a position of the one or more furniture objects, the second interface is further configured to change the position of the one or more furniture objects in the second virtual 3D environment.

11. The system of claim 9, wherein for the input to manipulate the one or more furniture objects from the selected and rendered ones of the set of multiple furniture objects placed into the list corresponding to changing a color or a display of the one or more furniture objects, the second interface is further configured to change the color or the display of the one or more furniture objects in the second virtual 3D environment.

12. The system of claim 9, wherein for the input to manipulate the one or more furniture objects from the selected and rendered ones of the set of multiple furniture objects placed into the list corresponding to operating one or more furniture associated functions, the second interface is further configured to operate the one or more furniture associated functions on the one or more furniture objects.

13. The system of claim 9, wherein at least one of the first interface or the second interface includes a keyword search interface configured to return corresponding one or more furniture objects responsive to a keyword search input.

14. The system of claim 13, wherein a selection of the corresponding one or more furniture objects changes a perspective view of the at least one of the first interface or the second interface to display the selection of the corresponding one or more furniture objects.

15. The system of claim 13, wherein for the corresponding one or more furniture objects responsive to the keyword search input not belonging to the multiple furniture objects that are selectable through the first interface, a selection of the one or more furniture objects causes a third 3D environment to be generated with the one or more furniture objects, the third 3D environment being different than the first 3D environment.

16. The system of claim 9, wherein the at least one processor is further configured to:

receive an indication for requesting additional information for one of the multiple furniture objects; and display one or more of available colors, a video, or a list of available sizes for the one of the multiple furniture objects via the first interface or the second interface.

17. The system of claim 9, further including a transceiver coupled to the at least one processor.

18. An apparatus for implementing a virtual showroom system, including:

means for receiving a selection of a room from a plurality of selectable rooms, each of the plurality of selectable rooms preset with a set of multiple furniture objects to be rendered with the each of the plurality of selectable rooms, the set of multiple furniture objects corresponding to a room type represented by the each of the plurality of selectable rooms;

means for providing a first interface including a first virtual three-dimensional (3D) environment representative of the selected room, the first virtual 3D environment including the set of multiple furniture objects corresponding to the selected room, the set of multiple furniture objects rendered with the selected room in the first virtual 3D environment, the rendered set of multiple furniture objects being selectable within the first virtual 3D environment through the first interface for placement into a list; and means for providing a second interface including a second virtual 3D environment that is separate from the first virtual 3D environment, the second interface configured to:

receive a selection of ones of the set of multiple furniture objects placed into the list to render in another room in the second virtual 3D environment, the another room initialized as an empty room; and receive an input to manipulate one or more furniture objects from the selected and rendered ones of the set of multiple furniture objects placed into the list in the second virtual 3D environment; and for receipt of a selection to proceed to a checkout screen, providing a checkout screen configured to facilitate a purchase of the selected and rendered ones of the set of multiple furniture objects rendered in the another room in the second virtual 3D environment.

19. The apparatus of claim 18, further including a transceiver.

20. A non-transitory computer-readable medium storing computer executable code at a computer server, the code when executed by a processor causes the processor to:

receive a selection of a room from a plurality of selectable rooms, each of the plurality of selectable rooms preset with a set of multiple furniture objects to be rendered with the each of the plurality of selectable rooms, the set of multiple furniture objects corresponding to a room type represented by the each of the plurality of selectable rooms;

provide a first interface including a first virtual three-dimensional (3D) environment representative of the selected room, the first virtual 3D environment including the set of multiple furniture objects corresponding to the selected room, the set of multiple furniture objects rendered with the selected room in the first virtual 3D environment, the rendered set of multiple furniture objects being selectable within the first virtual 3D environment through the first interface for placement into a list; and provide a second interface including a second virtual 3D environment that is separate from the first virtual 3D environment, the second interface configured to:
  receive a selection of ones of the set of multiple furniture objects placed into the list to render in another room in the second virtual 3D environment, the another room initialized as an empty room; and
  receive an input to manipulate one or more furniture objects from the selected and rendered ones of the set of multiple furniture objects placed into the list in the second virtual 3D environment; and
  for receipt of a selection to proceed to a checkout screen, providing a checkout screen configured to facilitate a purchase of the selected and rendered ones of the set of multiple furniture objects rendered in the another room in the second virtual 3D environment.

21. The method of claim 1, wherein the first interface is configured to intake input to directionally navigate within the first virtual three-dimensional (3D) environment representative of the selected room from a first-person perspective.

22. The method of claim 1, wherein the selection of the room from the plurality of selectable rooms is received through a navigation map;
  wherein for another selection of another room from the plurality of selectable rooms through the navigation map; changing the first virtual 3D environment to the another room and rendering the set of multiple furniture objects corresponding to the room type of the another room with the another room in the first interface.

23. The method of claim 1, wherein the room type of the another room is a same room type as the room type of the selected room.

* * * * *